US005089832A

United States Patent [19]

Muto

[11] Patent Number: 5,089,832

[45] Date of Patent: Feb. 18, 1992

[54] IMAGE FORMING APPARATUS

[75] Inventor: Hakaru Muto, Yokohama, Japan

[73] Assignee: Canon Kabushiki Kaisha, Tokyo, Japan

[21] Appl. No.: 545,645

[22] Filed: Jun. 29, 1990

[30] Foreign Application Priority Data

Jun. 30, 1989 [JP] Japan ................................ 1-169408

[51] Int. Cl.[5] ...................... G01D 15/06; G03G 21/00

[52] U.S. Cl. ................................ 346/160.1; 355/301

[58] Field of Search .................... 346/160.1; 355/299, 355/301

[56] References Cited

U.S. PATENT DOCUMENTS 3,914,771 10/1975 Lunde et al. .
4,788,564 11/1988 Ochiai ............................ 346/153.1
4,887,103 12/1989 Imai et al. ........................ 346/160.1
4,937,633 6/1990 Ewing .
4,989,021 1/1991 Ochiai et al. ..................... 346/160.1

FOREIGN PATENT DOCUMENTS 51-46707 12/1976 Japan .
0317242 5/1989 European Pat. Off. .

*Primary Examiner*—George H. Miller, Jr.
*Attorney, Agent, or Firm*—Fitzpatrick, Cella, Harper & Scinto

[57] ABSTRACT

An image forming apparatus includes recording electrodes electrically isolated from each other, a recording medium movable relative to the recording electrodes and a developer supplying device for supplying a conductive developer into between the recording electrodes and the recording medium. The invention is particularly related to the removal of the developer from the recording medium. The amount of electricity produced in the means for removing the developer is detected, and in response to the detection, a bias voltage applied to the removing means is controlled.

17 Claims, 8 Drawing Sheets

IMAGE FORMING APPARATUS

FIELD OF THE INVENTION AND RELATED ART

The present invention relates to an image forming apparatus wherein a developer is deposited on a recording medium, more particularly to an apparatus wherein an electric charge is applied on the recording medium by a recording electrode; the developer is deposited electrostatically on the charge; and the developer is removed from the recording medium thereafter.

U.S. Pat. No. 3,914,771 (Japanese Patent Application Publication No. 46707/1976) or the like discloses an image forming method wherein the developer is deposited on the recording medium. As shown in FIG. 2, conductive and magnetic toner 1 having a volume resistivity of $10^3$–$10^{10}$ ohm.cm is carried on a non-magnetic cylinder 3 with the aid of a rotating magnet 2, and the toner is passed on the recording electrode 4 made of magnetic material. A recording medium 5 has a conductive layer 7 and a surface insulating layer having a thickness of 1-10 micron and a volume resistivity of $10^8$–$10^{15}$ ohm.cm. A voltage is applied between the conductive layer 7 and the recording electrode 4, by which the toner 1 is deposited on the recording medium 5 to form an image.

FIG. 3 shows an example of such an image forming apparatus functioning as a display apparatus. The reference numeral 1 designates the toner. The apparatus comprises a recording electrode 4, the recording material (recording medium) 5 in the form of an endless belt, which will hereinafter be called "a recording belt", an erasing member 8 for removing the toner to erase the image, a toner container 10, recording belt supporting rollers 11, a main frame 12 and a record controller 13.

In accordance with the signal voltage from the recording electrode, the toner 1 is selectively deposited on the recording belt 5 to form an image. When, for example, a signal voltage of 40 V is applied from the record controller 13, the toner 1 is electrostatically deposited on the recording belt 5, whereas when 0 V is applied, the toner is attracted by the magnetic force so as not to be deposited on the recording medium. In this manner, an image is formed. The recording belt supporting roller 11 is driven by an unshown motor so that the recording belt 5 is rotated in the direction indicated by an arrow to present the image by the toner 1 to a display position where the image is displayed. Then, the toner image is contacted to an erasing member 8 made of electrically conductive carbon fibers, conductive resin, conductive rubber or the like having a volume resistivity of $10^1$–$10^6$ ohm.cm approximately, by which the electrostatic charge is removed from the recording belt 5, and the toner is mechanically removed from the recording medium. The toner 1 falls by the weight thereof into the container 10, and is prepared for the next recording operation. The erasing member 8 is supplied with a predetermined voltage V for the toner removal. The voltage is determined o the basis of the triboelectric charge properties of the recording medium 5 and the erasing member 8. In the prior art, the image with insignificant fog can be provided with the application of $-3$ V, where the recording medium 5 is made of titanium oxide, and the erasing member is made of carbon fibers.

FIG. 4 shows the structure around the above-described erasing member 8. The recording medium 5 having the insulating layer 6 and the conductive layer 7 is conveyed by an unshown driving means downwardly (the direction indicated by the arrow). Since the erasing member 8 is supplied with a bias voltage of $-3$ V from the voltage source 14, the positive electrostatic charge on the insulating layer 6 is removed, by which the toner 1 having been electrostatically deposited on the recording medium 5 by the recording electrode 4 becomes easily removed. With the easy removal state established, the toner 1 is forcedly removed by the brush 8*a* made of conductive carbon fibers having the volume resistivity of 10–$10^2$ ohm.cm, from the recording medium 5. However, as will be understood from the Figure, the toner 1 remains in many cases even after the recording medium 5 passes by the erasing member 8.

Since, however, the toner 1 is scraped by the rubbing between the recording medium 5' and the erasing member 8, the following problems arise:

(1) The rubbing between the erasing member and the recording member results in production of electric charge on the recording medium by the triboelectricity. The electric charge attracts the toner when the recording medium passes through the toner container, with the result that the surface of the recording medium is contaminated (foggy background). Because the cause of the foggy background relates to the triboelectricity, the production of the foggy background is significantly influenced by the ambient condition (relative humidity).

FIG. 5 shows the bias voltage relative to the relative humidity not producing the fog at 25° C. However, if the temperature is changed with the relative humidity remaining unchanged, the foggy background is produced when the temperature is low or high, as shown in FIG. 6.

(2) Since the toner is recollected for the repeated use, foreign matter can be contained in the toner during the repeated use. Therefore, when the life of the recording medium approaches its end, the foreign matter is accumulated in the toner with the result of the property change of the toner, so that the conditions for the production of the foggy background changes from the relation shown in FIG. 5.

SUMMARY OF THE INVENTION

It is a principal object of the present invention to provide an image forming apparatus in which the toner is removed substantially without the problems described above.

It is another object of the present invention to provide an image forming apparatus wherein the developer is removed from the recording medium properly without the influence by the ambient conditions or without the influence by the change of the property of the developer.

It is a further object of the present invention to provide an image forming apparatus wherein the developer can be sufficiently removed from the recording medium.

According to an aspect of the present invention, there is provided an image forming apparatus wherein the quantity of electricity on the toner removing member moving relative to the recording medium is detected, and in response to the detection, the bias voltage to be applied to the removing member is controlled, prior to the start of the image forming operation. By doing so, the triboelectric charge resulting from the rubbing between the removing member and the recording medium can be controlled, so that the fog production can be suppressed. In addition, the sharp image without fog can be provided even if the recording medium or the erasing member is deteriorated with use, or even if the electrostatic property of the toner changes by the contamination thereof with the foreign matter.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring to the accompanying drawings, the description will be made as to the preferred embodiments of the present invention.

Figure 1A:
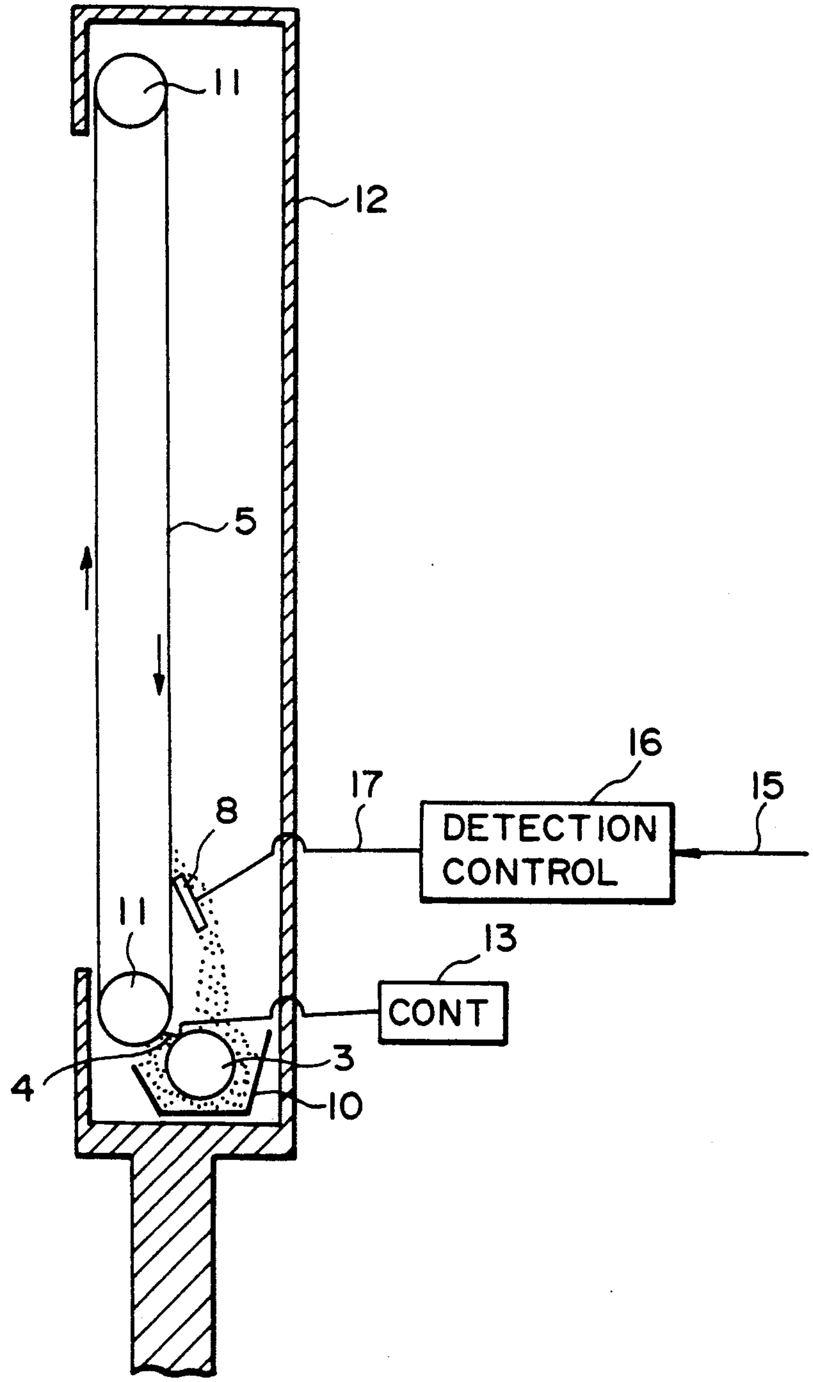
FIG. 1A is a sectional view of an image forming apparatus according to an embodiment of the present invention.

Referring to FIG. 1A, there is shown an image display apparatus to which the present invention is applicable. The same reference numerals as in the description hereinbefore are assigned to the corresponding elements, so that the detailed descriptions thereof are omitted for simplicity.

The apparatus comprises a control instruction line 15 connected with a control circuit not shown, and detecting and control means 16 which is a major part of the present invention. A cable 17 electrically connects the detecting and control means 16 and the erasing means 8.

Figure 1B:
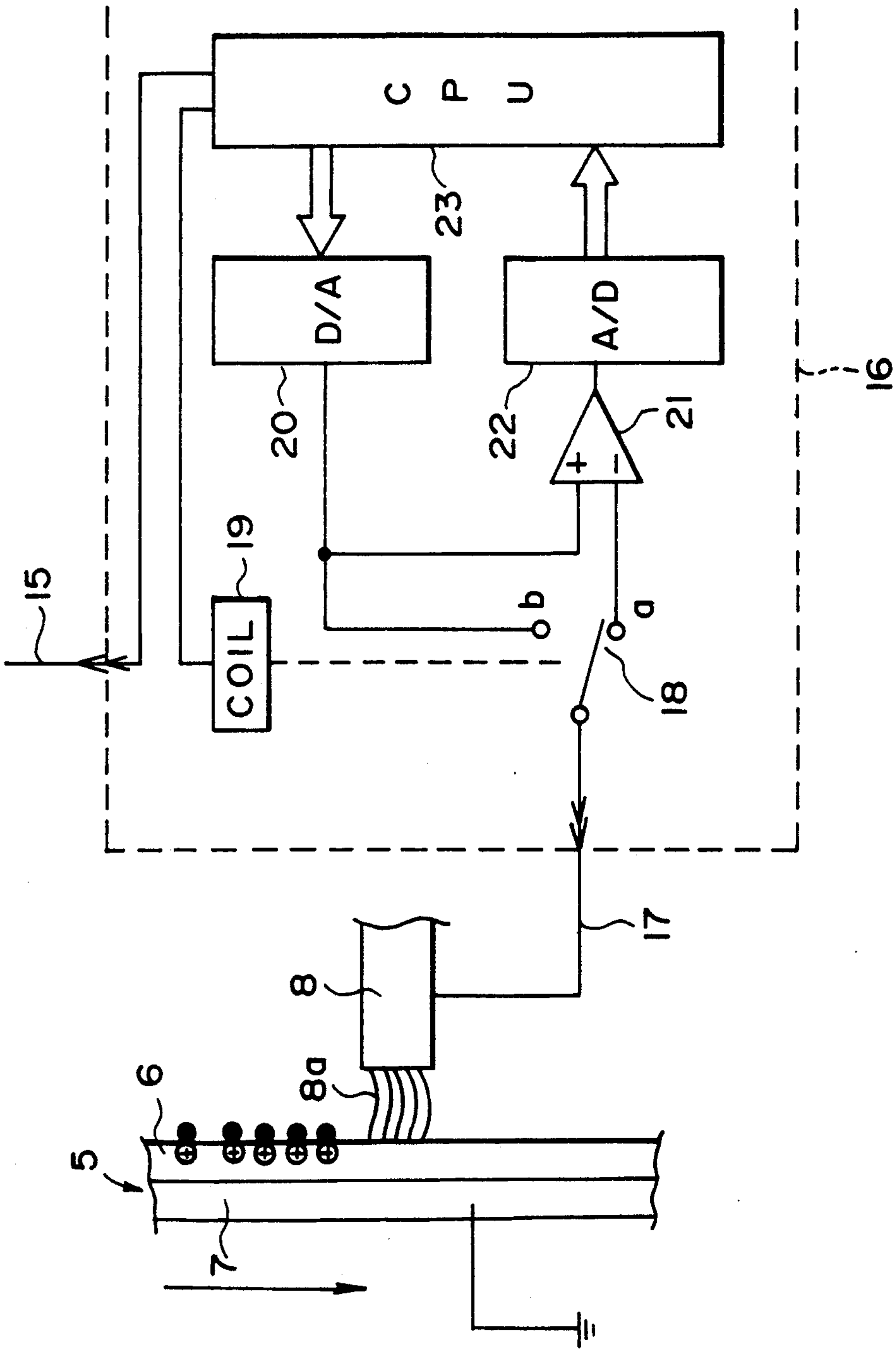
FIG. 1B is a circuit diagram for the control of the apparatus of the first embodiment.

FIG. 1B illustrates the detecting and control means 16 in detail. It comprises a relay contact 18 and is switched to the side of contact a when a relay coil 19 is energized. A digital-analog converter 20 has an output which is connected to a contact b of the relay. An operational amplifier 21 produces an output to an analog-digital converter 22. A microcomputer 23 is supplied with an input thereto through the control instruction line 15 and is supplied with an output of the analog-digital converter 22. It supplies data to the digital-analog converter 20.

Figure 1C:
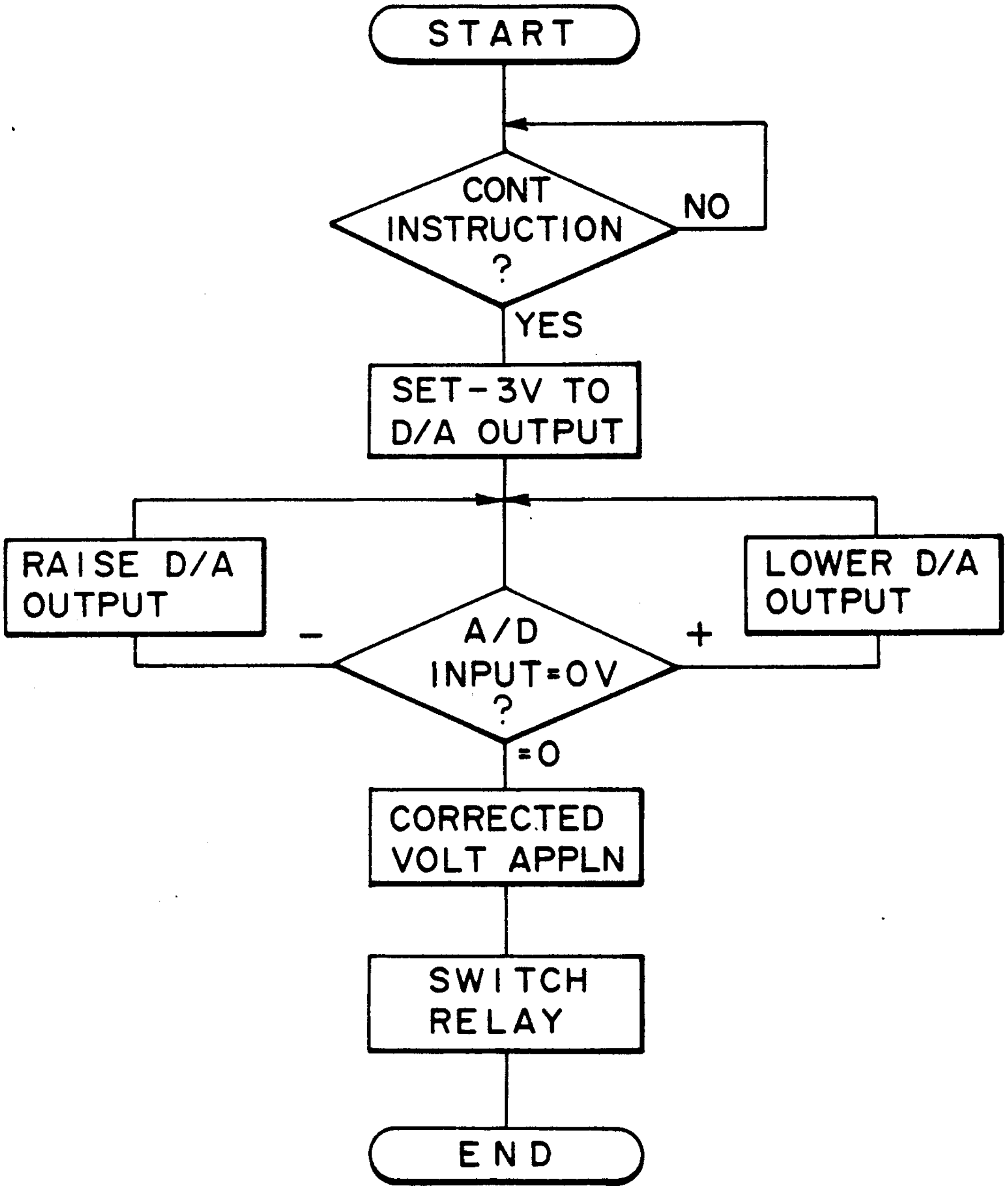
FIG. 1C is a flow chart illustrating the operation of the apparatus according to the first embodiment.

FIG. 1C shows a flow chart illustrating the sequential operation controlled by the microcomputer 23. The description will be made as to the operation of the circuit of FIG. 1B along the flow chart of FIG. 1C.

When the recording medium 5 starts movement for the display, an instruction signal is supplied to the detecting and control means 16 from an unshown control circuit through the control instruction line 15. Then, a control circuit (CPU) 23 detects the supply of the control signal, and supplies data to the digital-analog converter 20 to produce an output of −3 V. On the other hand, the recording medium 5 is conveyed at a constant speed predetermined by an unshown driving means.

Therefore, by the sliding movement between the erasing member 8 and the recording member 5, electric charge is produced. The electric charge is supplied to an inversion input terminal of the operational amplifier 21 through the contact a of the relay 18. As described above, the output of the digital-analog converter 20 is fixed at −3 V. If the ambient condition is low temperature and low humidity, a voltage lower than −3 V is produced on the erasing member 8, as will be understood from FIGS. 5 and 6. If, for example, the voltage is −5 V, the output of the operational amplifier 21 has a positive polarity because the non-inversion input terminal of the operational amplifier 21 is supplied with −3 V, and because the inverse input terminal is supplied with −5 V. The analog-digital converter 22 converts the analog output of the operational amplifier 21 to digital data, which are supplied to the CPU 23. The CPU 23 discriminates whether it is positive or negative. In this example, it is positive, and therefore, the control is effected to lower the output of the digital-analog converter.

Figure 5:
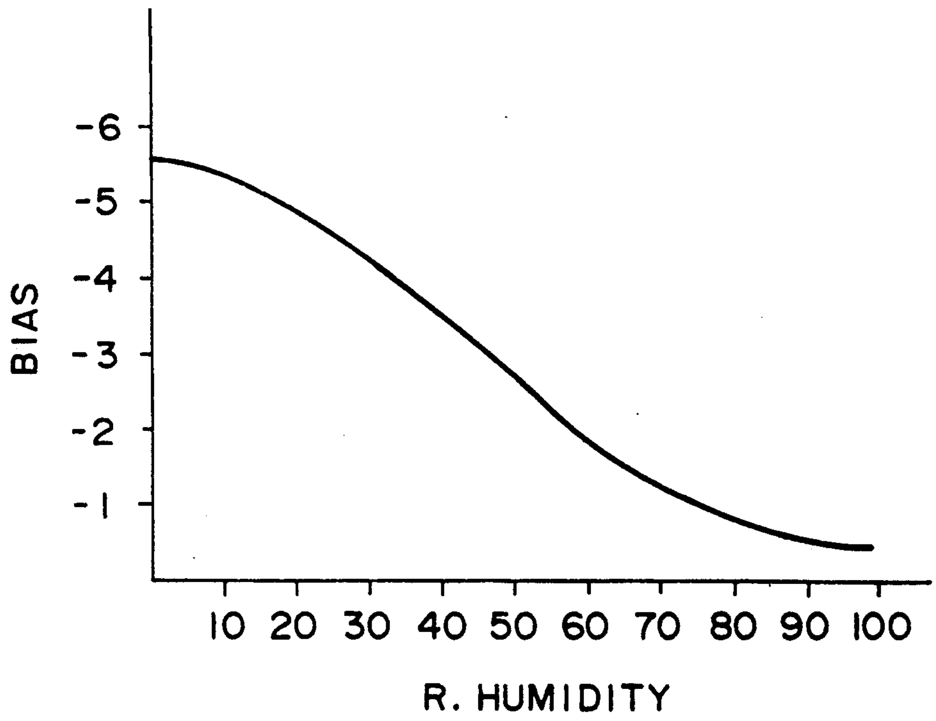
FIG. 5 shows a relationship between a bias voltage and a relative humidity to reduce the production of the fog.
Figure 6:
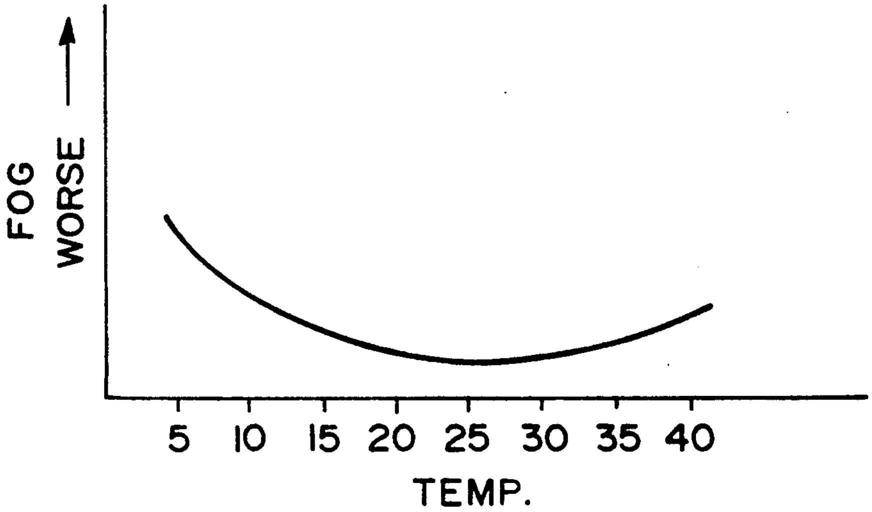
FIG. 6 shows the relationship between the fog production and the temperature when the bias voltage characteristics shown in FIGS. 6 and 5 are given.

If the relative humidity is close to 100% in FIG. 5, the output of the erasing member 8 is close to 0 V, and therefore, the output of the operational amplifier 21 is negative. Then, in FIG. 1C, the sequential operation proceeds to the left side.

The above-described operational loop is repeated, and when the analog-digital converter 22 detects 0 V, the CPU 23 drives the coil 19 of the relay with a voltage which is provided by adding a correction voltage to the data when the output of the operational amplifier 21 is 0 V. In addition, the relay 18 is switched to the contact b. By the series of the operations described above, the surface potential of the recording medium (sheet) becomes substantially 0, so that the image is without fog.

The correction voltage is added upon the transient condition of the recording sheet speed, that is, before the regular speed thereof is not reached at the time of the start. More particularly, when the speed is lower than the regular speed, the detection tends to be lower. Therefore, the correction voltage is applied so that the applied voltage is the one which is obtained by dividing the voltage directly corresponding to detected voltage by the speed reduction ratio. When the speed thereof is higher than the regular speed, which may also occur at the time of the start, the correction voltage is added in the opposite direction. The correction may also be made on the basis of the integrated use period of the sheet or toner in terms of their service life.

In this embodiment, the amount of electric charge of the toner erasing means 8 is directly detected, and a voltage corresponding thereto is applied to the erasing means, by which the production of the fog by the electric charge remaining due to the recording operation and the triboelectric charge by the friction can be eliminated.

Figure 1D:
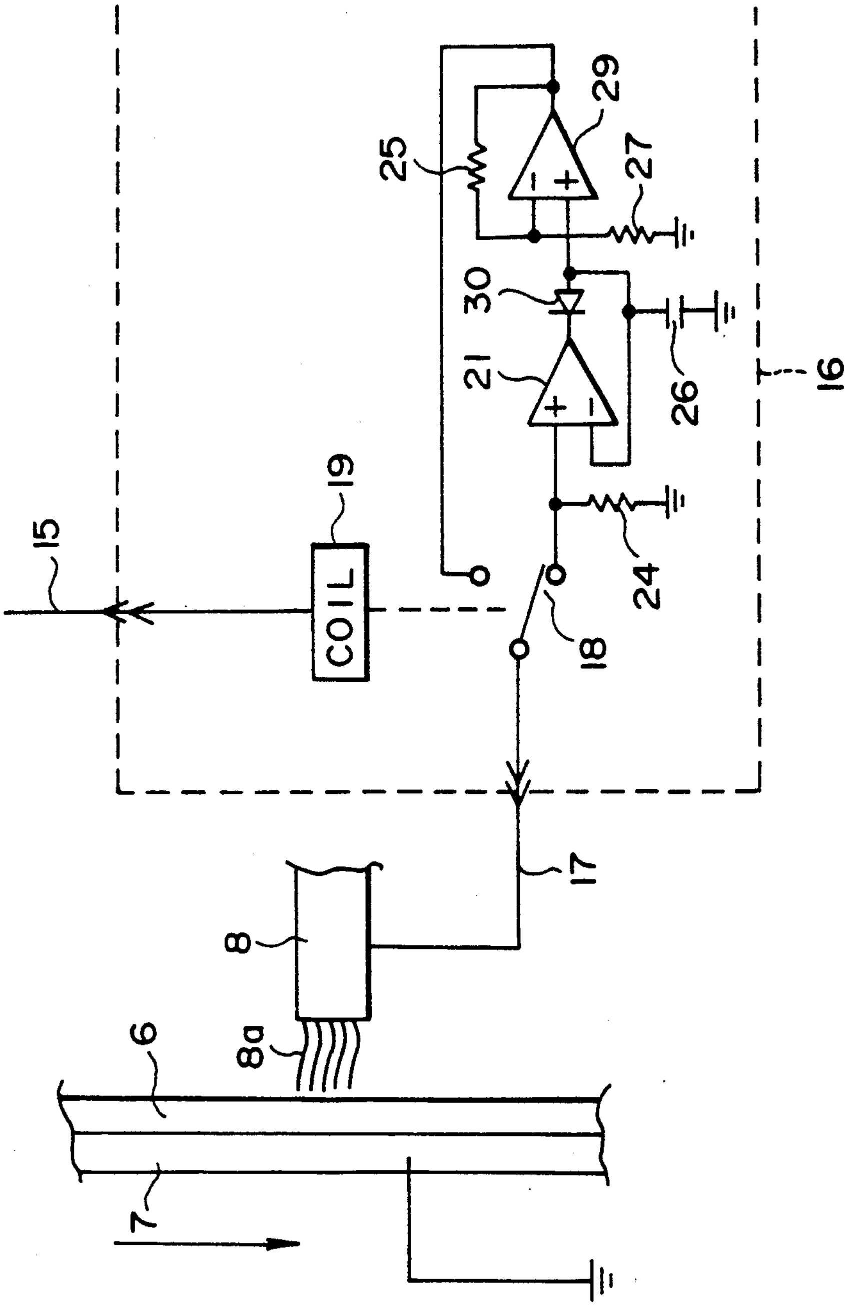
FIG. 1D is a circuit diagram of an apparatus according to a second embodiment.

FIG. 1D shows a second embodiment. In this Figure, reference numerals 24 and 26 designate a resistor and a capacitor. In this embodiment, in accordance with the flow of electric charge produced by the erasing means 8, that is, by the resistance 24 to the amount of electric current, the voltage is converted. The voltage is amplified by the operational amplifier 21 The voltage is peak-held by the capacitor 26 and the diode 30. The held voltage is properly amplified by a correcting circuit constituted by an operational amplifier 29, a resistor 25 and a resistor 27, and the resultant voltage is applied to the erasing means.

In this embodiment, the maximum of the electric charge produced on the erasing means 8 is applied to the erasing means. By doing so, the sharp image without the foggy background can be produced not only irrespective of the ambient condition change such as the temperature change and the humidity change but also irrespective of the change in the state of contact between the brush (erasing means) and the recording medium 5.

Figure 1E:
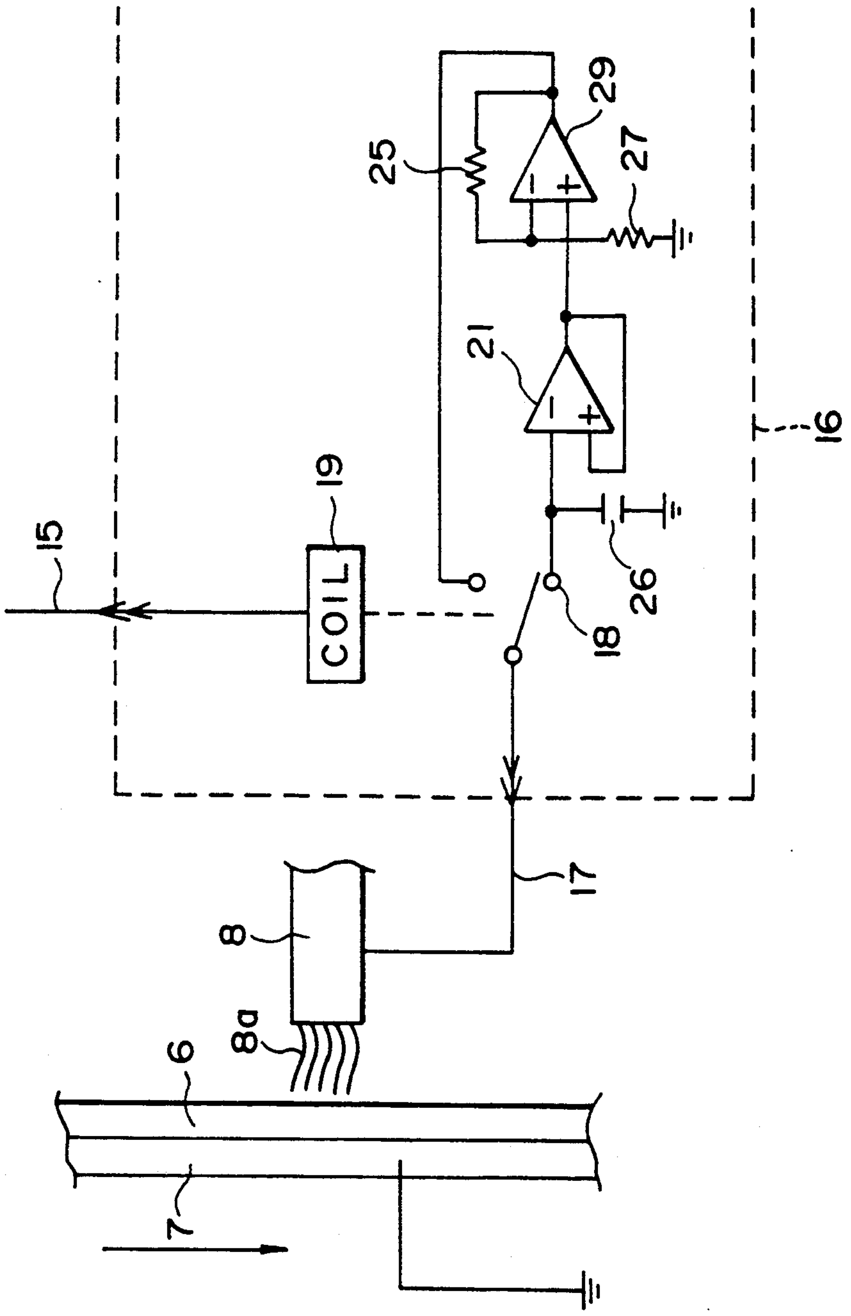
FIG. 1E is a circuit diagram for an apparatus according to a third embodiment.

FIG. 1E shows a further embodiment. In this embodiment, the electric charge produced on the erasing member 8 is used to charge a capacitor, and the voltage produced by the capacitor is applied to the erasing member. In this embodiment, the total amount of the electric charge in the period in which the relay 19 is energized appears on the control instruction line 15 connected to the unshown control circuit, and therefore, the good image without fog can be produced.

As described in the foregoing, according to the present invention, the quantity of electricity in the removing member is detected, and the voltage corresponding thereto is applied to the removing member, and therefore, the good image without fog and with small remaining electric charge can be produced.

Figure 2:
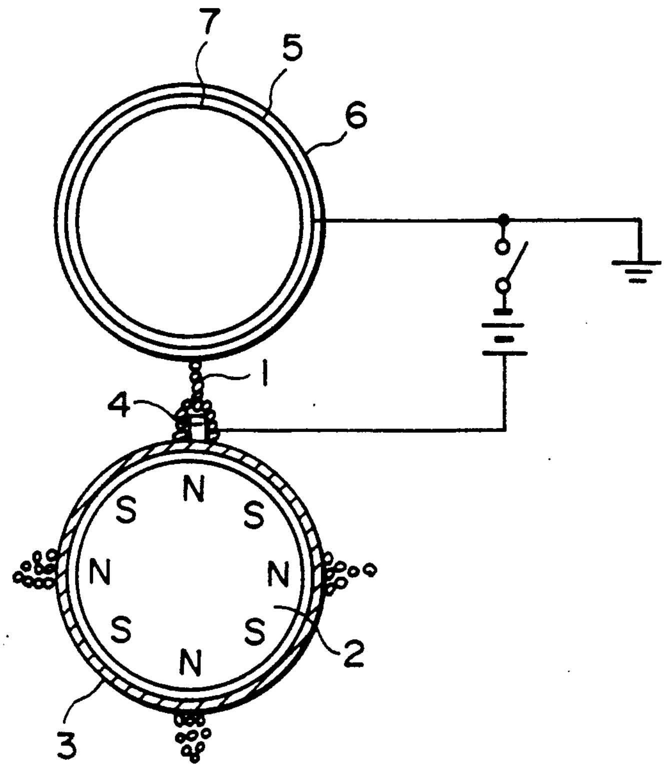
FIG. 2 illustrates the recording mechanism of the apparatus.
Figure 4:
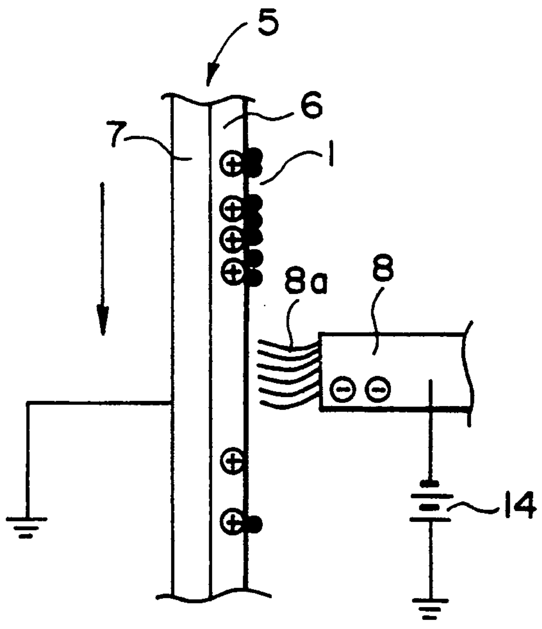
FIG. 4 shows a distribution of the electric charge when the foggy background is produced.
Figure 3:
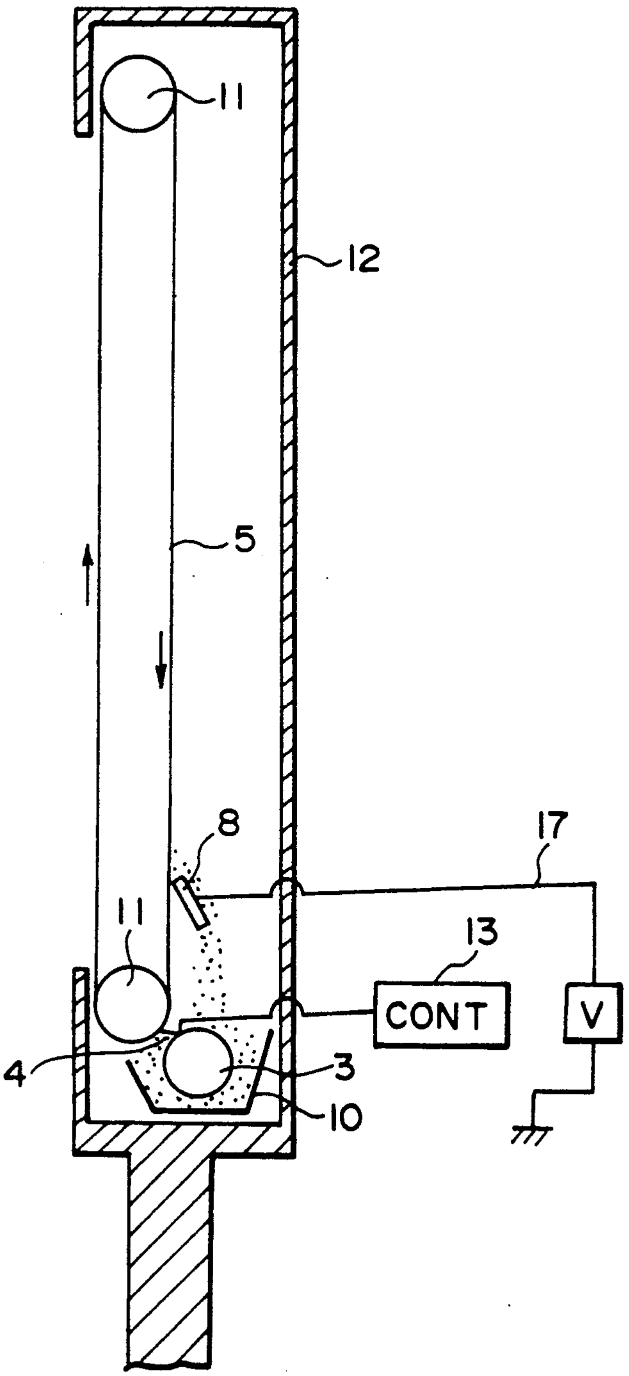
FIG. 3 is a sectional view of a conventional image forming apparatus.

The present invention is applied to another type of image forming apparatus such as a printer or a copying machine using an image formation mechanism shown in FIG. 2.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

recording electrodes electrically isolated from each other;

recording medium movable relative to said recording electrodes;

developer supply means for supplying an electrically conductive developer into between said recording electrodes and said recording medium;

developer removing means contactable to the recording medium to remove the developer from said recording medium;

detecting means for detecting an amount of electricity in said removing means; and means for controlling a bias voltage applied to said removing means in accordance with an output of said detecting means.

2. An apparatus according to claim 1, wherein said developer removing means is made of electrically conductive soft material.

3. An apparatus according to claim 2, wherein said removing means is made of an electrically conductive blade.

4. An apparatus according to claim 2, wherein said developer removing means is made of an electrically conductive brush.

5. An apparatus according to claim 4, wherein said conductive brush is made of carbon fibers.

6. An apparatus according to claim 1, wherein said apparatus displays an image formed by the developer on said recording medium

7. An apparatus according to claim 1, wherein said apparatus displays an image by the developer on said recording medium, and wherein said removing means removes the developer from said recording medium after contribution thereof for the display.

8. An apparatus according to claim 1, wherein said detecting means detects triboelectric charge produced by friction between said removing means and said recording medium.

9. An apparatus according to claim 1, wherein said detecting means includes a circuit for detecting triboelectric charge produced by friction between said removing means and said recording medium and a correction circuit.

10. An apparatus according to claim 9, wherein said correcting circuit corrects a bias voltage in accordance with a speed of said recording medium.

11. An apparatus according to claim 9, wherein said correcting circuit corrects a bias voltage in accordance with time of use of the developer.

12. An image forming apparatus, comprising:

recording electrodes electrically isolated from each other;

a recording medium movable relative to said recording electrodes;

developer supply means for supplying a conductive developer into between said recording electrodes and said recording medium;

developer removing means made of a conductive soft material and contactable to said recording medium to remove the developer from said recording medium;

detecting means for detecting as a quantity of electricity electric charge produced by friction between said removing means and said recording medium; and control means for controlling a bias voltage applied to said removing means in accordance with an output of said detecting means.

13. An apparatus according to claim 12, wherein said apparatus displays an image formed by the developer on said recording medium.

14. An apparatus according to claim 12, wherein said apparatus displays an image formed by the developer on said recording medium, and wherein said removing means removes the developer from said recording medium after contribution thereof to the display.

15. An apparatus according to claim 12, wherein said detecting means includes a circuit for detecting the electric charge produced by friction between said developer removing means and said recording medium and a correction circuit.

16. An apparatus according to claim 15, wherein said correcting circuit corrects the bias voltage in accordance with a speed of said recording medium.

17. An apparatus according to claim 15, wherein said correcting circuits corrects the bias voltage in accordance with time of use of said developer.

* * * * *

UNITED STATES PATENT AND TRADEMARK OFFICE
CERTIFICATE OF CORRECTION

PATENT NO. : 5,089,832

DATED : February 18, 1992

INVENTOR(S) : HAKARU MUTO

It is certified that error appears in the above-identified patent and that said Letters Patent is hereby corrected as shown below:

<u>COLUMN 1</u>

Line 23, "1-10 micron" should read --1-10 microns--.
Line 60, "o" should read --on--.

<u>COLUMN 2</u>

Line 17, "medium 5′ " should read --medium 5--.

<u>COLUMN 4</u>

Line 2, "5" should be deleted.

<u>COLUMN 6</u>

Line 65, "circuits" should read --circuit--.

Signed and Sealed this

Tenth Day of August, 1993

*Attest:*

MICHAEL K. KIRK

*Attesting Officer*

*Acting Commissioner of Patents and Trademarks*

--